United States Patent [19]

Hurner

[11] Patent Number: 4,666,597

[45] Date of Patent: May 19, 1987

[54] FUEL TREATMENT APPARATUS

[76] Inventor: Erwin E. Hurner, 320 Eighth Ave., W., West Fargo, N. Dak. 58078

[21] Appl. No.: 861,585

[22] Filed: May 9, 1986

Related U.S. Application Data

[62] Division of Ser. No. 774,285, Sep. 10, 1985, Pat. No. 4,624,779.

[51] Int. Cl.⁴ ............................................. B01D 35/00
[52] U.S. Cl. .................................... 210/232; 210/541; 210/542
[58] Field of Search ............... 210/232, 233, 234, 541, 210/542

[56] References Cited

U.S. PATENT DOCUMENTS

| | | | |
|---|---|---|---|
| 1,787,577 | 1/1931 | Hills | 210/436 |
| 4,502,955 | 3/1985 | Schaupp | 210/184 |
| 4,510,051 | 4/1985 | Diry | 210/185 |

Primary Examiner—Frank Sever
Attorney, Agent, or Firm—Bailey & Hardaway

[57] ABSTRACT

This invention provides a novel apparatus for removing contaminants from diesel fuel while simultaneously heating such fuel, and provides a collection zone for accumulating separated water and other contaminants.

5 Claims, 2 Drawing Figures

FUEL TREATMENT APPARATUS

This application is a division of application Ser. No. 774,285, filed Sept. 10, 1985, now U.S. Pat. No. 4,624,779.

BACKGROUND OF THE INVENTION

This invention relates generally to the art of fuel treatment and more particularly to an apparatus for removing contaminants from diesel fuel.

Various prior art devices have been developed for the treatment of fuel for use in internal combustion engines. Diesel fuel in particular has required substantial treatment in order to prevent contaminants or adverse weather conditions from affecting the combustion process.

U.S. Pat. No. 3,929,187, issued Dec. 30, 1975, discloses a heat exchange apparatus in order to prevent diesel fuel from jelling during periods of operation in extremely cold climates. U.S. Pat. No. 4,257,890 describes an apparatus for removing water from diesel fuel during normal operation of the vehicle.

Other fuel treatment devices are described in U.S. Pat. Nos. 4,437,986 and 4,372,847.

While each of these apparatuses perform well their intended function, a need exists for further improvements in devices for treating fuel for internal combustion engines.

SUMMARY OF THE INVENTION

It is thus an object of this invention to provide a novel apparatus for removing contaminants from diesel fuel.

It is a further object of this invention to provide such an apparatus which simultaneously heats such fuel while removing contaminants.

It is a still further object of this invention to provide such an apparatus which has a collection zone for accumulating separated water and other contaminants.

It is a still further and yet more particular object of this invention to provide a novel method for draining and a novel drain plug for removal of contaminants from a closed system.

These, as well as other objects, are accomplished by a fuel treatment apparatus having a settling chamber with an inlet in a lower portion thereof and an outlet in an upper portion thereof and with a filter-separator between the inlet and outlet through which the fuel must pass in arriving at the outlet. A downwardly pointed conical spreader is located above the inlet and spaced from the side walls to direct fuel from the inlet toward the space near the side walls. The upper surface of the conical spreader acts as a catcher to collect water and other contaminants which drop from the filter-separator. A water collection zone is at the bottom of the chamber and the conical spreader is provided with means to permit moisture and contaminants on the upper surface thereof to pass therethrough into the water collection zone. Drain means are provided to permit drainage of the water from the collection zone. A heating jacket surrounds the chamber in order to heat the treated fluid passing therethrough.

The novel drain means comprises a drain plug having a closure head and an elongated body portion defining drainage slots and vent passageways in order to permit drainage from the closed system by merely loosening the plug and permit drainage through the slots and ventage into the closed system through the vent passageways. Other methods of drainage, however, may be used with the treatment apparatus depending on the nature of fluids treated.

DETAILED DESCRIPTION

In accordance with this invention, it has been found that contaminants, particularly moisture, can be removed from fuel or other fluids during the operation of an internal combustion engine in a manner not heretofore contemplated. It has additionally been found that the fuel may simultaneously be heated while being filtered to result in both economy of space and increased efficiency. It has additionally been found that a novel method of draining and a novel drain plug may be used to remove accumulated moisture and other contaminants from the closed system. Various other advantages and features will become apparent from a reading the following specification given with reference to the various figures of drawing.

Figure 1:
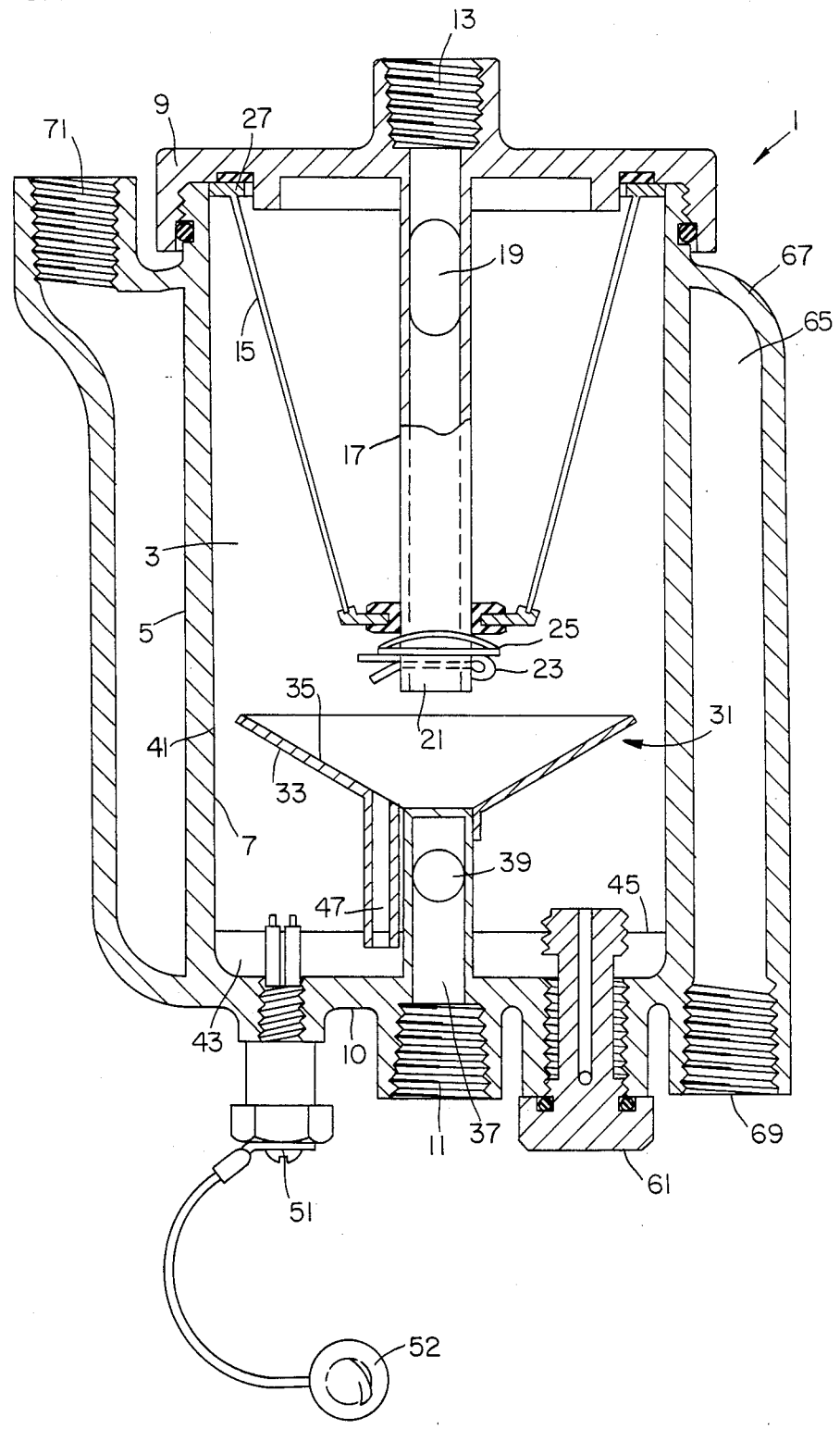
FIG. 1 of the drawings illustrate in cross-section view the apparatus in accordance with this invention.

FIG. 1 of the drawings illustrate the apparatus 1 in accordance with this invention. The view illustrated in FIG. 1 is generally a cross-section view through the center of the apparatus which is generally otherwise a closed system. The apparatus comprises a settling chamber 3 which is generally defined by means 5 having a wall 7 about the perimeter of the chamber, together with a removable lid 9 and integral bottom 10. The means 5 further define an inlet 11 at the bottom thereof and an outlet 13 at the top thereof.

A filter-separator 15 is interposed between the inlet 11 and outlet 13 and all fuel passing through the settling chamber must pass through filter-separator 15. The filter-separator 15 is preferably formed of teflon upon a suitable support such as a stainless steel screen as is well recognized within the art. It is preferred to use a stainless steel support with 70 micron passages for the teflon.

In actual operation fuel contains moisture generally as free moisture or as an emulsion or other dispersion within the fuel. Other contaminants such as entrained gases may also be removed by the filter-separator. Upon contacting the teflon filter-separator, free water as well as emulsified disbursed moisture, coalesces to form droplets which due to the density variations drop from the filter-separator 15 upon achieving sufficient size. The moisture as well as other contaminants is removed by techniques to be described below.

The filter-separator 15 is generally resiliently retained in place by outlet conduit means 17 having orifices 19 therein. The orifices 19 permit fluid communication between the inside of filter-separator 15 and outlet 13. The end 21 of conduit means 17 is closed, but provides for a support such as cotter pin 23 and spring 25 to resiliently maintain filter-separator 15 in contact with lid 9 as at 27. Such a structure would permit, if need arose, replacement of filter-separators. It is preferred that orifices 19 have an area which is three times the area of inlet orifices 39 described below.

A generally conical spreader 31 is concentric with filter-separator 15 and placed therebelow. Conical spreader 31 has a lower surface 33 and an upper surface 35. Inlet conduit means 37 support conical spreader 31 and also define a pair of orifices 39 which permit fluid communication between inlet 11 and chamber 3.

It is seen that spreader 31 is spaced from wall 7 as at 41 to provide a flow path about spreader 31 whereby fuel must pass through space 41 as it flows along the bottom surface 33 of conical spreader 31.

Upper surface 35 of spreader 31 acts as a gatherer to accumulate moisture and other debris or contaminants which have fallen from filter-separator 15.

A moisture and contaminant collection zone 43 exists within bottom of chamber 3 for the accumulation of moisture and other contaminants. A water level line 45 is illustrated here for purposes of description. The water collection zone is preferably below orifices 39 in order to minimize the incoming fuel from being contaminated by passing through accumulated contaminants. Means 47 are provided to permit moisture and other contaminants gathered upon surface 35 to flow into collection zone 43 when gathered upon surface 35.

Means 51 for detecting the presence of moisture at a predetermined level are provided and may be any of the types of detectors described in U.S. Pat. Nos. 4,475,498; 4,437,986; or 4,372,847, the disclosures of which are hereby incorporated by reference. Upon detecting the presence of water at a predetermined level, light 52 is activated as a visual indicator for the operator. Light 52 is preferably located near apparatus 1 to permit viewing during drainage thereof. The moisture and contaminants are then drained by novel drain plug 61 which will be further described below with reference to FIG. 2 of the drawings.

A water jacket 65 is provided and defined by the outer surface of means 5 and containment vessel 67. The water jacket 65 is supplied with engine coolant through water inlet 69 and exhausts water through outlet 71. In actual operation within a motor vehicle, coolant passes through water jacket 65 for the heating of fuel contained within treatment chamber 3. It is additionally seen that spreader 31 while providing the functions described above additionally creates a flow path whereby all fuel must pass through space 41 and thereby pass in close proximity to wall 7 and thereby create an efficient heat exchange relationship with water jacket 65.

Figure 2:
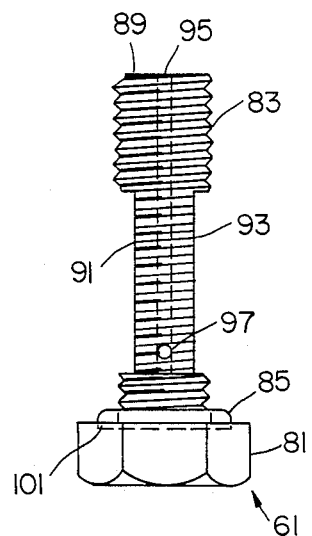
FIG. 2 of the drawings is an enlarged view of plug 39 illustrated in FIG. 1.

Also in actual operation the chamber 3 is a closed chamber completely filled with fuel which makes necessary the removal of contaminants from zone 43 by the novel technique to be described. Zone 43 as illustrated in FIG. 1 contains moisture and contaminants accumulated to level 45. Drain plug 39 is provided to permit drainage of the moisture from zone 43 without simultaneously removing fuel. FIG. 2 of the drawings is an enlarged view of plug 39. Plug 39 is generally a conventionally shaped bolt having a closure head 81 and an elongated body 83 attached to head 39 at 85 and unattached at end 89.

Body portion 83 defines slots 91 and 93 in the side thereof adapted to permit moisture to flow therethrough when plug 61 is loosened to permit slots 91 and 93 to communicate through the bottom 10 of chamber 3. It has been surprisingly and unexpectedly found that providing a vent 95 through the central portion of body 83 and communicating through the surface of body portion 93 as at 97, that venting air passes through opening 97 and opening 95 while moisture and contaminants pass through slots 91 and 93. This even occurs when end 89 is located within the fuel of the chamber above level 45. It is not entirely clear why this phenomenon occurs, but it permits drainage of contaminants from the apparatus of this invention as well as from any other closed system.

It is preferred that slots 91 and 93 be slightly below vent exit 97 to prevent moisture and contaminants from entering vent exit at 97. A distance of 1/16 of an inch has been found satisfactory for this purpose.

Moisture is removed by simply loosening bolt 61 until slots 91 and 93 are exposed below the bottom 10 of chamber 3 as well as vent 97. Water and contaminants flow through slots 91 and 93 until absence is indicated by deactivation of light 52. This technique always provides for the retention of a small amount of water in collection zone 43 so that no fuel is discharged during drainage. The prevention of fuel discharge is particularly important to prevent road and roadside contamination.

Upon removal of contaminants and deactivation of light 52, plug 61 is tightened back into the chamber to seal the chamber from further drainage. The head 81 of plug 61 is provided with a machined ring to retain "O" ring 101 in position and to seal chamber 3 from drainage when plug 61 is hand tight against bottom 10. During the process of draining contaminants from the system, a small amount of air passes through vent 97 and into chamber 3 which has insignificant effect on engine operation.

While the above description has been given with reference to fuel treatment, it is readily apparent that any fluid may be equally as well treated and such description should be so construed.

It is thus seen that the apparatus of this invention provides a novel apparatus for removing contaminants from fuel. It is further seen that the apparatus not only provides means for removing contaminants, but also for heating fuel during engine operation. The apparatus of this invention additionally provides for a novel and unique drain plug for use therewith, as well as for use with other systems. As many variations will become apparent to those of skill in the art from a reading of the above description, such variations are embodied within the spirit and scope and of the following appended claims:

That which is claimed is:

1. A drain plug, comprising:
a closure head;
means for enabling engagement with a closed fuel filter system, including, an elongated body attached to said head at one end and unattached at the other end having an outer surface and defining at least one slot on said outer surface extending less than the entire length thereof between said ends and defining a vent within a central portion of said body, said vent communicating through said other end and through said surface to permit liquid to flow through said slot out of said closed system and to permit air to flow through said vent to replace said liquid in said closed system.

2. The plug according to claim 1 wherein said body is a cylindrically shaped threaded screw.

3. The drain plug according to claim 2 wherein said body defines two slots in the surface thereof for the passage of liquid therethrough.

4. The apparatus according to claim 3 wherein said closure head define a seat for an "O" ring and further comprising an "O" ring within said seat.

5. The apparatus according to 3 wherein said slots terminate on said surface below said vent from said head.

* * * * *